United States Patent
Oguro et al.

(10) Patent No.: US 12,320,038 B2
(45) Date of Patent: Jun. 3, 2025

(54) FILAMENT AND FISHING LINE

(71) Applicant: Mitsubishi Gas Chemical Company, Inc., Tokyo (JP)

(72) Inventors: Hatsuki Oguro, Hiratsuka (JP); Nobuhiko Matsumoto, Hiratsuka (JP); Takafumi Oda, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 432 days.

(21) Appl. No.: 17/618,282

(22) PCT Filed: Apr. 14, 2020

(86) PCT No.: PCT/JP2020/016359
§ 371 (c)(1),
(2) Date: Dec. 10, 2021

(87) PCT Pub. No.: WO2020/250564
PCT Pub. Date: Dec. 17, 2020

(65) Prior Publication Data
US 2022/0349093 A1    Nov. 3, 2022

(30) Foreign Application Priority Data
Jun. 11, 2019    (JP) ................. 2019-108864

(51) Int. Cl.
| | | |
|---|---|---|
| *D01F 6/60* | (2006.01) | |
| *A01K 91/00* | (2006.01) | |
| *C08G 69/26* | (2006.01) | |
| *D01F 6/80* | (2006.01) | |

(52) U.S. Cl.
CPC ............... *D01F 6/60* (2013.01); *A01K 91/00* (2013.01); *C08G 69/26* (2013.01); *D01F 6/80* (2013.01); *D10B 2401/063* (2013.01)

(58) Field of Classification Search
CPC ....... D01F 6/60; D01F 6/80; D10B 2401/063; A01K 91/00; C08G 69/26; C08G 69/265; Y10T 428/29
See application file for complete search history.

(56) References Cited

U.S. PATENT DOCUMENTS

| | | | | |
|---|---|---|---|---|
| 3,652,509 A * | 3/1972 | Tsuda | ................... | C08G 69/265 57/244 |
| 2004/0242803 A1 | 12/2004 | Ohme et al. | | |
| 2007/0260019 A1 | 11/2007 | Ohme et al. | | |
| 2011/0165359 A1 | 7/2011 | Le et al. | | |
| 2015/0218731 A1 * | 8/2015 | Mitadera | ................... | D01F 1/10 428/397 |
| 2016/0002832 A1 * | 1/2016 | Matsumoto | .......... | C08G 69/265 442/181 |
| 2017/0073469 A1 | 3/2017 | Tochihara et al. | | |
| 2018/0171142 A1 * | 6/2018 | Otsuka | ..................... | D01F 6/80 |

FOREIGN PATENT DOCUMENTS

| | | | | |
|---|---|---|---|---|
| CN | 1564848 A | 1/2005 | | |
| CN | 102089354 A | 6/2011 | | |
| CN | 105829398 A | 8/2016 | | |
| CN | 107735514 A | 2/2018 | | |
| EP | 3059340 A1 * | 8/2016 | ............... | D01F 6/60 |
| EP | 2729516 B1 * | 3/2017 | ............. | C08G 69/26 |
| EP | 3323914 A1 * | 5/2018 | ............. | C08G 69/26 |
| GB | 1129074 A | 10/1968 | | |
| JP | S48-63050 A | 9/1973 | | |
| JP | H05-44109 A | 2/1993 | | |
| JP | H11-81041 A | 3/1999 | | |
| JP | 2000-154426 A | 6/2000 | | |
| JP | 2003-026797 A | 1/2003 | | |
| JP | 2005-002298 A | 1/2005 | | |
| JP | 2006-122005 A | 5/2006 | | |
| JP | 2010-281027 A | 12/2010 | | |
| JP | 2011-527369 A | 10/2011 | | |
| JP | 2016-223037 A | 12/2016 | | |
| WO | 2015/174345 A1 | 11/2015 | | |

OTHER PUBLICATIONS

Machine Translation of EP2729516 (Year: 2017).*
EPO; Application No. 20822500.3; Extended European Search Report dated May 30, 2023, 7 pages.
International Preliminary Report on Patentability and Written Opinion for PCT/JP2020/016359, mailed Jun. 23, 2020, and English Translation submitted herewith (10 pages).
International Search Report for PCT/JP2020/016359, mailed Jun. 23, 2020, and English Translation submitted herewith (7 pages).
CNIPA; Application No. 202080040633.9; Office Action dated Feb. 13, 2022, 8 pages.

* cited by examiner

*Primary Examiner* — Jennifer A Steele
(74) *Attorney, Agent, or Firm* — Fitch, Even, Tabin & Flannery LLP

(57) ABSTRACT

Provided are a filament having, after a water absorption treatment, a high maintenance rate of linear strength and a high maintenance rate of knot strength, and a fishing line. The filament contains a polyamide resin (A), and the polyamide resin (A) is constituted from a constituent unit derived from a diamine and a constituent unit derived from a dicarboxylic acid, and 70 mol % or more of the constituent units derived from a diamine are derived from xylylene diamine, and 70 mol % or more of the constituent units derived from a dicarboxylic acid are derived from an α,ω-linear aliphatic dicarboxylic acid having from 11 to 14 carbons.

15 Claims, No Drawings

FILAMENT AND FISHING LINE

CROSS-REFERENCE TO RELATED APPLICATIONS

This application is a U.S. national phase application filed under 35 U.S.C. § 371 of International Application Number PCT/JP2020/016359, filed Apr. 14, 2020, designating the United States, which claims priority from Japanese Application Number 2019-108864, filed Jun. 11, 2019.

FIELD OF THE INVENTION

The present invention relates to a filament and a fishing line. In particular, the present invention relates to a filament in which a polyamide resin is used.

BACKGROUND OF THE INVENTION

The use of polyamide resins in filaments has been examined in the past.

For example, Patent Document 1 discloses a monofilament containing a polyamide resin, wherein the polyamide resin contains a unit derived from 8-caprolactam and/or ε-aminocaproic acid (hereinafter, also referred to as "unit 1"), a unit derived from adipic acid (hereinafter, also referred to as "unit 2"), and a unit derived from hexamethylene diamine (hereinafter, also referred to as "unit 3"), the content of the unit 1 being greater than 60 mass % and less than 80 mass % with respect to the total of the units 1, 2, and 3.

Patent Document 2 discloses a polyamide filament containing a polyamide resin obtained through polycondensation of an aliphatic diamine containing pentamethylene diamine as a main component and a dicarboxylic acid containing adipic acid as a main component.

CITATION LIST

Patent Documents

Patent Document 1: JP 2016-223037 A
Patent Document 2: JP 2010-281027 A

SUMMARY OF INVENTION

As described above, polyamide resins are used in filaments, but for example, when a polyamide resin is used in a fishing line, the fishing line is required to exhibit a high maintenance rate of linear strength and a high maintenance rate of knot strength after a water absorption treatment.

Thus, the present invention is designed to solve the problems described above, and an object of the present invention is to provide a filament having, after a water absorption treatment, a high maintenance rate of linear strength and a high maintenance rate of knot strength, and a fishing line.

The present inventors conducted examinations on the basis of the problems described above, and as a result, discovered that the above problems can be solved by using a filament containing a polyamide resin synthesized from a xylylene diamine and an α,ω-linear aliphatic dicarboxylic acid having from 11 to 14 carbons, or the like.

Specifically, the above problems can be solved by the following means.

<1> A filament containing a polyamide resin (A), wherein the polyamide resin (A) is constituted from a constituent unit derived from a diamine and a constituent unit derived from a dicarboxylic acid, 70 mol % or more of the constituent units derived from a diamine are derived from xylylene diamine, and 70 mol % or more of the constituent units derived from a dicarboxylic acid are derived from an α,ω-linear aliphatic dicarboxylic acid having from 11 to 14 carbons.

<2> The filament according to <1>, wherein the filament is stretched.

<3> The filament according to <12> or <2>, wherein the xylylene diamine includes from 10 to 90 mol % of meta-xylylene diamine and from 90 to 10 mol % of para-xylylene diamine (provided that a total of the meta-xylylene diamine and the para-xylylene diamine does not exceed 100 mol %).

<4> The filament according to <1> or <2>, wherein the xylylene diamine includes from 40 to 80 mol % of meta-xylylene diamine and from 60 to 20 mol % of para-xylylene diamine (provided that a total of the meta-xylylene diamine and the para-xylylene diamine does not exceed 100 mol %).

<5> The filament according to <1> or <2>, wherein the xylylene diamine includes from 51 to 75 mol % of meta-xylylene diamine and from 49 to 25 mol % of para-xylylene diamine (provided that a total of the meta-xylylene diamine and the para-xylylene diamine does not exceed 100 mol %).

<6> The filament according to any of one of <1> to <5>, wherein the dicarboxylic acid includes 1,12-dodecanedioic acid.

<7> The filament according to any one of <1> to <6>, wherein the filament has a maintenance rate $[(X^2/X^1) \times 100]$ of a linear strength $X^2$ after the filament has been immersed in 23° C. water for 336 hours with respect to a linear strength $X^1$ after the filament has been dried for 74 hours at 40° C. of 90% or more, with the linear strength being a value measured in accordance with JIS L 1013:2010.

<8> The filament according to any one of <1> to <7>, wherein the filament has a maintenance rate $[(Y^2/Y^1) \times 100]$ of a knot strength $Y^2$ after the filament has been immersed in 23° C. water for 336 hours with respect to a knot strength $Y^1$ after the filament has been dried for 74 hours at 40° C. of 70% or more, with the knot strength being a value measured in accordance with JIS L 1013:2010.

<9> A fishing line containing the filament described in any one of <1> to <8>.

According to the present invention, a filament having, after a water absorption treatment, a high maintenance rate of linear strength and a high maintenance rate of knot strength, and a fishing line can be provided.

DESCRIPTION OF EMBODIMENTS

Contents of the present invention will be described in detail below. In the present specification, "from . . . to . . . " or "of . . . to . . . " is used to mean that the numerical values described before and after "to" are included as the lower limit and the upper limit, respectively.

A filament of the present invention contains a polyamide resin (A), and is characterized in that the polyamide resin (A) is constituted from a constituent unit derived from a diamine and a constituent unit derived from a dicarboxylic acid, 70 mol % or more of the constituent units derived from a diamine are derived from xylylene diamine, and 70 mol % or more of the constituent units derived from a dicarboxylic acid are derived from an α,ω-linear aliphatic dicarboxylic acid having from 11 to 14 carbons. With such a constitution, a filament having a high maintenance rate of linear strength and a high maintenance rate of knot strength after a water absorption treatment can be obtained.

<Polyamide Resin (A)>

The filament of the present invention contains a polyamide resin (A) that is constituted from a constituent unit derived from a diamine and a constituent unit derived from a dicarboxylic acid, with 70 mol % or more of the constituent units derived from a diamine being derived from xylylene diamine, and 70 mol % or more of the constituent units derived from a dicarboxylic acid being derived from an α,ω-linear aliphatic dicarboxylic acid having from 11 to 14 carbons.

By using such a polyamide resin (A), the maintenance rate of linear strength and the maintenance rate of knot strength after a water absorption treatment can be increased. Although the reason for this is inferred, it is speculated that the maintenance rates of the linear and knot strengths are improved due to the polyamide resin (A) having a glass transition temperature after the water absorption treatment of room temperature or higher. Note that polyamide resins synthesized from a xylene diamine and an α,ω-linear aliphatic dicarboxylic acid having from 11 to 14 carbons, and the like are known to have a low water absorption rate. However, in some cases there may be no correlation between the low water absorption rate and the maintenance rates of the physical properties after the water absorption treatment.

Furthermore, with the present invention, a filament better excelling in transparency is obtained by using the polyamide resin (A). A filament having high strength can also be obtained by using the polyamide resin (A).

In the polyamide resin (A), 70 mol % or more of the constituent units derived from a diamine are derived from xylylene diamine, and the proportion thereof is preferably 80 mol % or more, more preferably 90 mol % or more, even more preferably 95 mol % or more, and yet even more preferably 99 mol % or more.

The xylylene diamine preferably includes from 10 to 90 mol % of meta-xylylene diamine and from 90 to 10 mol % of para-xylylene diamine (provided that the total of the meta-xylylene diamine and the para-xylylene diamine does not exceed 100 mol %), more preferably includes from 40 to 80 mol % of meta-xylylene diamine and from 60 to 20 mol % of para-xylylene diamine, and even more preferably includes from 51 to 75 mol % of meta-xylylene diamine and from 49 to 25 mol % of para-xylylene diamine. Furthermore, in the xylylene diamine, the total of the meta-xylylene diamine and the para-xylylene diamine preferably accounts for 95 mol % or more, more preferably accounts for 99 mol % or more, and is even more preferably 100 mol %.

Examples of diamine compounds besides xylylene diamine include aliphatic diamines such as tetramethylene diamine, pentamethylene diamine, 2-methylpentane diamine, hexamethylene diamine, heptamethylene diamine, octamethylene diamine, nonamethylene diamine, decamethylene diamine, dodecamethylene diamine, 2,2,4-trimethylhexamethylene diamine, and 2,4,4-trimethylhexamethylene diamine; alicyclic diamines such as 1,3-bis(aminomethyl) cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring(s), such as bis(4-aminophenyl)ether, p-phenylene diamine, and bis(aminomethyl)naphthalene. One type thereof can be used, or two or more types can be mixed and used.

In the polyamide resin (A), 70 mol % or more of the constituent units derived from a dicarboxylic acid are derived from an α,ω-linear aliphatic dicarboxylic acid having from 11 to 14 carbons (preferably an α,ω-linear aliphatic dicarboxylic acid having from 12 to 14 carbons, and more preferably, 1,12-dodecanedioic acid), and the proportion thereof is preferably 80 mol % or more, more preferably 90 mol % or more, even more preferably 95 mol % or more, and yet even more preferably 99 mol % or more.

Examples of the dicarboxylic acid component besides the α,ω-linear aliphatic dicarboxylic acid having from 11 to 14 carbons include α,ω-linear aliphatic dicarboxylic acids having from 10 of fewer carbons, such as succinic acid, glutaric acid, pimelic acid, suberic acid, azelaic acid, adipic acid, and sebacic acid; phthalic acid compounds, such as isophthalic acid, terephthalic acid, and orthophthalic acid; and naphthalene dicarboxylic acids, such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used alone, or two or more types thereof can be mixed and used.

Note that "constituted from a constituent unit derived from a diamine and a constituent unit derived from a dicarboxylic acid" indicates that an amide bond constituting the polyamide resin (A) is formed by a bond between a dicarboxylic acid and a diamine. The polyamide resin (A) may also contain another moiety such as a terminal group in addition to the constituent unit derived from a dicarboxylic acid and the constituent unit derived from a diamine. Furthermore, repeating units having amide bonds that are not derived from the bond between the dicarboxylic acid and the diamine, and trace impurities, and the like may also be included. Specifically, as components constituting the polyamide resin (A), besides the diamine component and the dicarboxylic acid component, lactams such as ε-caprolactam and laurolactam, and aliphatic aminocarboxylic acids such as aminocaproic acid and aminoundecanoic acid can also be used as copolymer components constituting the polyamide resin, within a range that does not impair the effect of the present invention. In the present invention, preferably 90 mass % or more, more preferably 95 mass % or more, and even more preferably 98 mass % or more of the polyamide resin (A) is the constituent unit derived from a diamine or the constituent unit derived from a dicarboxylic acid.

The number average molecular weight (Mn) of the polyamide resin (A) used in the present invention is preferably from 6000 to 50000, more preferably from 8000 to 48000, and even more preferably from 9000 to 46000. When the number average molecular weight (Mn) is in such a range, molding processability is more favorable.

Note that the number average molecular weight (Mn) referred to here can be determined by gel permeation chromatography (GPC) measurements based on calibration with standard polymethylmethacrylate (PMMA).

In the present invention, the lower limit of the glass transition temperature of the polyamide resin (A) is preferably 30° C. or higher, more preferably 45° C. or higher, and even more preferably 50° C. or higher. In this range, the maintenance rate of linear strength and the maintenance rate of knot strength after a water absorption treatment tend to be higher. On the other hand, the upper limit of the glass transition temperature of the polyamide resin (A) is not particularly stipulated, and for example, can be set to 200° C. or lower.

Note that the "melting point" in the present invention refers to the temperature at which the endothermic peak reaches its maximum during temperature increase, observed by the Differential Scanning calorimetry (DSC) method. Specifically, the "melting point" refers to the maximum temperature in an endothermic peak that is observed using a DSC device when 1 mg of a sample is heated and melted from room temperature (25° C.) to a temperature equal to or higher than an expected melting point at a temperature increase rate of 10° C./min while nitrogen is streamed at 30 mL/min as an atmosphere gas, after which the melted polyamide resin is rapidly cooled by dry ice, and the temperature is then increased again to a temperature that is equal to or higher than the melting point at a rate of 10° C./min.

The "glass transition temperature" refers to a glass transition temperature measured by heating and melting a sample once to eliminate the effect of the thermal history on the crystallinity, and then increasing the temperature once again. Specifically, using a DSC device and approximately 1 mg as a sample amount, the glass transition temperature can be determined by rapidly cooling with dry ice a polyamide resin that has been heated and melted from room temperature to a temperature equal to or higher than an expected melting point at a temperature increase rate of 10° C./min while nitrogen is streamed at 30 mL/min as an atmosphere gas, and then increasing the temperature once again to a temperature that is equal to or higher than the melting point at a rate of 10° C./min.

The lower limit of the relative viscosity (RV) of the polyamide resin (A) measured under the conditions specified by JIS K 69020-2 is preferably 2.0 or more, more preferably 2.1 or more, and even more preferably 2.3 or more. On the other hand, the upper limit of the relative viscosity of the polyamide resin (A) is preferably 4.0 or less, more preferably 3.9 or less, and even more preferably 3.8 or less. When the relative viscosity is set to such a range, linear strength and knot strength tend to further improve.

In addition, in the filament of the present invention, the polyamide resin (A) preferably accounts for 70 mass % or more, more preferably 80 mass % or more, even more preferably 90 mass % or more, and more preferably 95 mass % or more, of the filament.

The filament of the present invention may contain only one polyamide resin (A), or may contain two or more polyamide resins (A). When the filament of the present invention contains two or more polyamide resins (A), the total amount is preferably in the above range.

<Other Resin Components>

The filament of the present invention may contain a polyamide resin besides the polyamide resin (A), or a thermoplastic resin besides polyamide.

Examples of the polyamide resin besides the polyamide resin (A) include polyamide 4, polyamide 6, polyamide 11, polyamide 12, polyamide 46, polyamide 66, polyamide 6/66, polyamide 610, polyamide 612, polyhexamethylene terephthalamide (polyamide 6T), polyhexamethylene isophthalamide (polyamide 6I), polyamide 66/6T, polyamide 9T, polyamide 9MT, polyamide 6I/6T, polyamide XD6 (polyxylylene adipamide), and polyamide XD10 (polyxylylene sebacamide), and polyamide 6, polyamide 66, polyamide 666, polyamide 610 and polyamide 612 are preferable.

When the filament of the present invention contains the polyamide resin (A) and a polyamide resin besides the polyamide resin (A), the mass ratio (polyamide resin (A): polyamide resin besides the polyamide resin (A)) is preferably 100:1 to 100, and more preferably 100:10 to 90.

The filament of the present invention may contain only one polyamide resin besides the polyamide resin (A), or may contain two or more these polyamide resins. When the filament of the present invention contains two or more polyamide resins besides the polyamide resin (A), the total amount is preferably in the above range.

Examples of other thermoplastic resins besides the polyamide resin include polyolefin resins such as polyethylene and polypropylene; polyester resins such as polyethylene terephthalate and polybutylene terephthalate; polycarbonate resins, polyoxymethylene resins, polyether ketones, polyether sulfones, and thermoplastic polyether imides.

In addition, the filament of the present invention can be constituted containing substantially no thermoplastic resin other than the polyamide resin (polyamide resin (A) and polyamide resin other than the polyamide resin (A)). Containing substantially no thermoplastic resin other than the polyamide resin means, for example, that the content of the thermoplastic resin other than the polyamide resin in the filament of the present invention is 5 mass % or less of the mass of the polyamide resin.

<Additives>

Furthermore, additives such as antioxidants, thermal stabilizers, hydrolysis-resistant improving agents, weather resistant stabilizers, matting agents, UV absorbers, nucleating agents, plasticizers, dispersants, flame retardants, antistatic agents, anti-coloration agents, anti-gelling agents, colorants, release agents, and surfactants may be added to the filament of the present invention within a scope that does not impair the object and effect of the present invention. For details on these additives, reference can be made to the disclosures in paragraphs [0130] to [0155] of JP 4894982 B, paragraph [0021] of JP 2010-281027 A, and paragraph [0036] of JP 2016-223037 A, the contents of which are incorporated herein.

Specific examples of the plasticizer include hexyldecyl p-hydroxybenzoate (Exceparl HD-PB, available from Kao Corporation), ethylhexyl p-hydroxybenzoate, ethylhexyl o-hydroxybenzoate, and N-butylbenzenesulfonamide. Reference can also be made to the disclosures in paragraphs [0033] to [0038] of WO 2017/010389, the contents of which are incorporated herein.

Also, the filament of the present invention may contain a filler such as carbon fibers, but preferably substantially contain no filler. Containing substantially no filler means that, for example, the compounded amount of the filler is 3 mass % or less of the filament of the present invention.

The filament of the present invention can also be subjected to a plasma treatment to impart any surface properties. For details thereof, reference can be made to the disclosures in paragraphs [0019] to [0022] of JP 06-182195 A, the contents of which are incorporated herein.

<Characteristics and Physical Properties of Filament>

The length (mass average length) of the filament of the present invention is not particularly stipulated, but is normally 2 cm or more, preferably 0.1 m or more, more preferably 1 m or more, and even more preferably 100 m or more. The upper limit of the length (mass average length) of the filament is preferably 20000 m or less, more preferably 1000 m or less, and even more preferably 100 m or less.

The lower limit of the fineness of the filament of the present invention is preferably 50 d (denier) or more, more preferably 100 d or more, even more preferably 300 d or more, yet even more preferably 500 d or more, and still even more preferably 600 d or more. The upper limit is preferably 1500 d or less, more preferably 1300 d or less, even more preferably 1200 d or less, and particularly preferably 1100 d or less.

The fineness is measured by a method described in the examples below.

The filament of the present invention may be a monofilament or a multifilament, but a monofilament is preferred. The filament may also be a core-sheath structure.

The cross section of the filament of the present invention is usually circular. The "circular" used herein is intended to include not only circular in a mathematical sense, but also circular as generally recognized in the technical field of the present invention. Also, the cross section of the filament of the present invention may be a shape other than circular, and may be, for example, a flat shape such as an ellipse or an oval.

The filament of the present invention preferably has a maintenance rate $[(X^2/X^1) \times 100]$ of a linear strength $X^2$ after a water absorption treatment with respect to a linear strength $X^1$ when dry of 90% or higher, more preferably 92% or higher, even more preferably 93% or higher, and yet even more preferably 94% or higher. The upper limit of the maintenance rate of the linear strength after the water absorption treatment is preferably 100%.

The filament of the present invention preferably has a maintenance rate $[(Y^2/Y^1) \times 100]$ of a knot strength $Y^2$ after a water absorption treatment with respect to a knot strength $Y^1$ when dry of 70% or higher, more preferably 80% or higher, even more preferably 85% or higher, and yet even more preferably 90% or higher. The upper limit of the maintenance rate of the linear strength after the water absorption treatment is preferably 100%.

The maintenance rate of the linear strength after the water absorption treatment and the maintenance rate of the knot strength after the water absorption treatment are measured by a method described in the examples described below.
<Stretching>

Further, the filament of the present invention may or may not be stretched, but is preferably stretched. The stretching is preferably implemented in the longitudinal direction of the filament (filament length direction). The stretching ratio is preferably 2.5 times or more, more preferably 3.0 times or more, even more preferably 3.5 times or more, and still more preferably 3.8 times or more. In addition, the upper limit of the stretching ratio is preferably 8.0 times or less, more preferably 7.5 times or less, even more preferably 7.0 times or less, and still more preferably 6.5 times or less.
<Production Method>

The filament of the present invention is obtained by molding a polyamide resin (A) or a composition containing the polyamide resin (A). Any molding method may be used, and the filament may be molded into a desired shape by any known molding method such as melt spinning. For example, reference can be made to the disclosures in paragraphs [0051] to [0058] of WO 2017/010389, the contents of which are incorporated herein.

Details such as the molding conditions and the shape after molding may be appropriately selected and determined according to the application thereof. For example, such details may be changed, as appropriate, according to applications such as a filament for a fishing line, a filament for a fishing net, a filament for industrial materials, a filament for a woven fabric such as clothing or carpet, and racket gutting.
<Applications>

The filament of the present invention may be used as is, but may also be processed into a molded material such as mixed filament yarn, braid, or string. In addition, the filament is preferably used as a molding material such as a woven fabric, a knitted fabric, or a nonwoven fabric.

The filament of the present invention can be widely used in applications such as components for automobiles and other such transportation devices, general mechanical components, precision mechanical components, electronic and electrical device components, OA device components, building materials and building-related components, medical devices, leisure sporting goods (for example, fishing lines), gaming devices, medical products, household goods such as food packaging films and clothing, and defense and aerospace products.

The filament of the present invention may be wound onto a core material. That is, a wound body can be formed with the core material and the filament wound on the core material.

EXAMPLES

The present invention will be described more specifically with reference to examples below. Materials, amounts used, ratios, processing details, processing procedures, and the like described in the following examples can be changed as appropriate as long as they do not depart from the spirit of the present invention. Thus, the scope of the present invention is not limited to the specific examples described below.
Raw Material
<Synthesis of Polyamide MP12>

A precisely weighed amount of 60.00 mol of 1,12-dodecanedioic acid was inserted into a jacketed reaction vessel equipped with a stirrer, a partial condenser, a cooler, a thermometer, a dropping funnel, and a nitrogen gas introduction tube, and sufficiently nitrogen substituted, after which the temperature was raised to 180° C. under a small stream of nitrogen, and the 1,12-dodecanedioic acid was dissolved, and a homogeneous fluid state was formed. To this, 60 mol of para/meta-xylylene diamine was added dropwise while stirring over a period of 160 minutes, the para/meta-xylylene diamine being such that 40 mol % of a diamine component was para-xylylene diamine and 60 mol % was meta-xylylene diamine. During this time, the pressure inside the reaction system was set to normal pressure, the internal temperature was continuously increased to 250° C., and the water that distilled out along with the dropwise addition of the para/meta-xylylene diamine was removed from the system through the partial condenser and the cooler. After completion of the dropwise addition of the para/meta-xylylene diamine, a liquid temperature of 250° C. was maintained, and the reaction was continued for 10 minutes. Next, the pressure inside the reaction system was continuously reduced to 600 Torr over 10 minutes, after which the reaction was continued for 20 minutes. During this time, the reaction temperature was continuously raised to 260° C. After the completion of the reaction, a pressure of 0.3 MPa was applied to the inside of the reaction vessel using nitrogen gas, and the polymer was removed as a strand from a nozzle at the lower part of the polymerization tank, cooled with water, and then cut into a pellet shape to obtain pellets of the melt polymerized article. The obtained pellets were inserted at room temperature into a tumbler (rotary vacuum tank) having an overcoat for heating a heat medium. The inside of the tank was depressurized (from 0.5 to 10 Torr) while the tumbler was rotated, the circulating heat medium was heated to 190° C., and the pellet temperature was raised to 180° C., and then the pellets were held at that temperature for 5 hours. Subsequently, nitrogen was reintroduced to adjust the pressure to atmospheric pressure, and cooling was started. When the temperature of the pellets was reduced to 70° C. or lower, the pellets were removed from the tank, and a solid-phase polymerization product was obtained.

The melting point of the obtained polyamide resin (MP12) was 216° C., the glass transition temperature was 57° C., and the relative viscosity was 2.36.

N612: polyamide 612, available from Ube Industries, Ltd., 7034B; the melting point of the polyamide 612 was 205° C., the glass transition temperature was 25° C., and the relative viscosity was 3.86.

Examples 1 to 4, Comparative Examples 1 and 2

<Production of Filament>

The polyamide MP12 was melted using a single-screw extruder, spun through a spinneret with a spinning temperature of 260° C., drawn into a water bath having a temperature of 50° C., and stretched continuously without being wound even once. The stretching was implemented with two stages of stretching and one stage of thermal fixation. A hot water bath having a temperature of 70° C. was used as the stretching means in the first stage stretching region, and a dry heat air bath having a temperature of 200° C. was used in the second stage stretching, and the stretching conditions included a total stretching ratio of from 3 to 6, a two stage stretching ratio from 1.0 to 1.5, and a relaxation rate of 5%. Filaments were obtained by the method described above.

The obtained filaments were dried (when dry) at 40° C. for 74 hours. The filaments when dry were also immersed in water having a temperature of 23° C. for 336 hours (when water absorption treated). Filaments when dry and filaments after the water absorption treatment were subjected to various evaluations. The results are shown in Table 1.

<Fineness>

The fineness (fineness based on corrected mass) was measured in accordance with the stipulations of JIS L 1013:2010 for both the filaments when dry and the filaments after the water absorption treatment. The units are shown in denier (d).

<Linear Strength and Elongation>

Linear strength and elongation were measured in accordance with JIS L 1013:2010 for the filaments when dry and the filaments after the water absorption treatment. The linear strength was expressed in units of gf/g, and the elongation was expressed as a percentage (%).

<Knot Strength and Elongation>

The knot strengths of the filaments when dry and the filaments after the water absorption treatment were measured in accordance with JIS L 1013:2010. The knot strength was expressed in units of gf/g, and the elongation was expressed as a percentage (%).

<Maintenance Rate of Linear Strength after Water Absorption Treatment and Maintenance Rate of Knot Strength after Water Absorption Treatment>

The maintenance rate of the linear strength after the water absorption treatment was determined by calculating the maintenance rate $[(X^2/X^1)\times100]$ (unit:%) of the linear strength $X^2$ after the water absorption treatment with respect to the linear strength $X^1$ when dry.

The maintenance rate of the knot strength after the water absorption treatment was determined by calculating the maintenance rate $[(Y^2/Y^1)\times100]$ (unit:%) of the knot strength $Y^2$ after the water absorption treatment with respect to the knot strength $Y^1$ when dry.

TABLE 1

|  |  |  | Example 1 | Example 2 | Example 3 | Example 4 | Comparative Example 1 | Comparative Example 2 |
|---|---|---|---|---|---|---|---|---|
| Type of polyamide resin |  |  | MP12 | | | | N612 | |
| When dry | Stretching ratio | times | 3.8 | 4.2 | 4.5 | 5.8 | 3.7 | 5.3 |
|  | Fineness | d | 1025 | 931 | 878 | 680 | 1117 | 783 |
|  | Linear Strength | gf/d | 4.3 | 5.5 | 5.7 | 8.2 | 5.2 | 8.9 |
|  | Knot Strength | gf/d | 3.4 | 3.8 | 4.0 | 3.5 | 4.8 | 5.0 |
| After water absorption treatment | Fineness | d | 1220 | 935 | 887 | 845 | 1060 | 713 |
|  | Linear Strength | gf/d | 4.3 | 5.3 | 5.4 | 7.9 | 4.0 | 7.7 |
|  | Knot Strength | gf/d | 3.4 | 3.8 | 3.7 | 3.5 | 3.1 | 2.5 |
| Maintenance rate of linear strength after water absorption treatment | | % | 100 | 96 | 95 | 96 | 77 | 87 |
| Maintenance rate of knot strength after water absorption treatment | | % | 100 | 100 | 93 | 100 | 65 | 50 |

As is clear from the above results, the filaments containing the polyamide resin (A) had a high maintenance rate of linear strength and a high maintenance rate of knot strength after the water absorption treatment.

When the filament obtained in Example 4 was connected to a fishing line as a snell knot and used, it was possible to use the filament in sea fishing without any problems.

The invention claimed is:

1. A filament comprising a polyamide resin (A),
   the polyamide resin (A) being constituted from a constituent unit derived from a diamine and a constituent unit derived from a dicarboxylic acid, and
   all of the constituent units derived from a diamine being derived from xylylene diamine or all of the constituent units derived from a diamine being derived from both xylylene diamine and a diamine other than xylylene diamine, where the diamine other than xylylene diamine is at least one kind of diamine selected from the group consisting of tetramethylene diamine, pentamethylene diamine, 2-methylpentane diamine, hexamethylene diamine, heptamethylene diamine, octamethylene diamine, nonamethylene diamine, decamethylene diamine, dodecamethylene diamine, 2,4,4-trimethylhexamethylene diamine, 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane, bis(4-aminophenyl) ether, p-phenylene diamine, and bis(aminomethyl) naphthalene, and 70 mol % or more of the constituent units derived from a dicarboxylic acid being derived from 1,12-dodecanedioic acid, and other constituent units derived from a dicarboxylic acid are derived from the group consisting of succinic acid, glutaric acid, pimelic acid, suberic acid, azelaic acid, adipic acid, phthalic acid compounds, and naphthalene dicarboxylic acid, wherein the filament is free from plasticizer, and wherein the xylylene diamine comprises from 10 to 90 mol % of meta-xylylene diamine and from 90 to 10 mol % of para-xylylene diamine, provided that a total of the meta-xylylene diamine and the para-xylylene diamine does not exceed 100 mol %.

2. The filament according to claim 1, wherein the filament is stretched.

3. The filament according to claim 1, wherein the xylylene diamine comprises from 40 to 80 mol % of meta-xylylene diamine and from 60 to 20 mol % of para-xylylene diamine provided that a total of the meta-xylylene diamine and the para-xylylene diamine does not exceed 100 mol %.

4. The filament according to claim 1, wherein the xylylene diamine comprises from 51 to 75 mol % of meta-xylylene diamine and from 49 to 25 mol % of para-xylylene diamine, provided that a total of the meta-xylylene diamine and the para-xylylene diamine does not exceed 100 mol %.

5. The filament according to claim 1, wherein the filament has a maintenance rate $[(X^2/X^1)\times100]$ of a linear strength $X^2$ after the filament has been immersed in 23° C. water for 336 hours with respect to a linear strength $X^1$ after the filament has been dried for 74 hours at 40° C. of 90% or more, with the linear strength being a value measured in accordance with JIS L 1013:2010.

6. The filament according to claim 1, wherein the filament has a maintenance rate $[(Y^2/Y^1)\times100]$ of a knot strength $Y^2$ after the filament has been immersed in 23° C. water for 336 hours with respect to a knot strength $Y^1$ after the filament has been dried for 74 hours at 40° C. of 70% or more, with the knot strength being a value measured in accordance with JIS L 1013:2010.

7. A fishing line comprising the filament described in claim 1.

8. The filament according to claim 2, wherein the xylylene diamine comprises from 40 to 80 mol % of meta-xylylene diamine and from 60 to 20 mol % of para-xylylene diamine provided that a total of the meta-xylylene diamine and the para-xylylene diamine does not exceed 100 mol %.

9. The filament according to claim 2, wherein the xylylene diamine comprises from 51 to 75 mol % of meta-xylylene diamine and from 49 to 25 mol % of para-xylylene diamine, provided that a total of the meta-xylylene diamine and the para-xylylene diamine does not exceed 100 mol %.

10. The filament according to claim 2, wherein the filament has a maintenance rate $[(X^2/X^1)\times100]$ of a linear strength $X^2$ after the filament has been immersed in 23° C. water for 336 hours with respect to a linear strength $X^1$ after the filament has been dried for 74 hours at 40° C. of 90% or more, with the linear strength being a value measured in accordance with JIS L 1013:2010.

11. The filament according to claim 2, wherein the filament has a maintenance rate $[(Y^2/Y^1)\times100]$ of a knot strength $Y^2$ after the filament has been immersed in 23° C. water for 336 hours with respect to a knot strength $Y^1$ after the filament has been dried for 74 hours at 40° C. of 70% or more, with the knot strength being a value measured in accordance with JIS L 1013:2010.

12. The filament according to claim 1, wherein the filament has a maintenance rate $[(X^2/X^1)\times100]$ of a linear strength $X^2$ after the filament has been immersed in 23° C. water for 336 hours with respect to a linear strength $X^1$ after the filament has been dried for 74 hours at 40° C. of 90% or more, with the linear strength being a value measured in accordance with JIS L 1013:2010.

13. The filament according to claim 1, wherein the filament has a maintenance rate $[(Y^2/Y^1)\times100]$ of a knot strength $Y^2$ after the filament has been immersed in 23° C. water for 336 hours with respect to a knot strength $Y^1$ after the filament has been dried for 74 hours at 40° C. of 70% or more, with the knot strength being a value measured in accordance with JIS L 1013:2010.

14. The filament according to claim 3, wherein the filament has a maintenance rate $[(X^2/X^1)\times100]$ of a linear strength $X^2$ after the filament has been immersed in 23° C. water for 336 hours with respect to a linear strength $X^1$ after the filament has been dried for 74 hours at 40° C. of 90% or more, with the linear strength being a value measured in accordance with JIS L 1013:2010.

15. The filament according to claim 1, wherein 80 mol % or more of the constituent units derived from a dicarboxylic acid are derived from 1,12-dodecanedioic acid.

* * * * *